(12) United States Patent
Takeda et al.

(10) Patent No.: US 7,089,100 B2
(45) Date of Patent: Aug. 8, 2006

(54) BICYCLE INFORMATION PROCESSING APPARATUS WITH MEMORY PROTECTION

(75) Inventors: Kazuhiro Takeda, Sakai (JP); Satoshi Kitamura, Kitakatsuragi-gun (JP); Haruyuki Takebayashi, Yao (JP)

(73) Assignee: Shimano, Inc., Sakai (JP)

( * ) Notice: Subject to any disclaimer, the term of this patent is extended or adjusted under 35 U.S.C. 154(b) by 93 days.

(21) Appl. No.: 10/708,650

(22) Filed: Mar. 17, 2004

(65) Prior Publication Data
US 2004/0220712 A1 Nov. 4, 2004

(30) Foreign Application Priority Data
Mar. 27, 2003 (JP) .............................. 2003-088792

(51) Int. Cl.
*G01M 17/00* (2006.01)
(52) U.S. Cl. ........................................................ 701/35
(58) Field of Classification Search .................. 701/35; 702/149
See application file for complete search history.

(56) References Cited

U.S. PATENT DOCUMENTS

| 4,071,892 | A |   | 1/1978  | Genzling             |
|-----------|---|---|---------|----------------------|
| 5,261,858 | A |   | 11/1993 | Browning             |
| 5,335,188 | A | * | 8/1994  | Brisson ...... 702/163 |
| 5,357,177 | A |   | 10/1994 | Fey et al.           |
| 6,192,300 | B1|   | 2/2001  | Watarai et al.       |
| 6,804,763 | B1| * | 10/2004 | Stockdale et al. ...... 711/170 |

FOREIGN PATENT DOCUMENTS
JP 2000-016367 1/2000

\* cited by examiner

*Primary Examiner*—Thu V. Nguyen
(74) *Attorney, Agent, or Firm*—James A. Deland

(57) ABSTRACT

A bicycle information processing apparatus comprises a memory for storing information related to the bicycle; an information processing unit that accesses the memory and processes information stored in the memory; and a power supply sensor that detects an ability of a power supply to supply power so that the memory may be accessed without damaging information stored therein.

16 Claims, 11 Drawing Sheets

BICYCLE INFORMATION PROCESSING APPARATUS WITH MEMORY PROTECTION

BACKGROUND OF INVENTION

The present invention is directed to bicycles and, more particularly, to a bicycle information processing apparatus with memory protection.

Cycle computers typically calculate and display bicycle-related information such as the bicycle velocity, travel distance, total distance, and so on. Such a cycle computer is shown in Japanese Unexamined Patent Application (Kokai) 2000-16367. More specifically, cycle computers typically comprise a memory for storing information, an information processing unit (e.g., a microprocessor) that accesses the memory and processes the information stored therein, a liquid crystal display (LCD) for displaying information processed by the information processing unit, and a power supply such as an internally mounted battery for supplying power to the various components. A conventional rotation sensor comprising a reed switch mounted on the bicycle frame and a magnet mounted on a wheel is operatively coupled with or without wires to the information processing unit, and the information processing unit computes the velocity, travel distance and total distance based on electrical pulses from the rotation sensor. Many current cycle computers are built so that at least the LCD and related components are detachably mounted to the bicycle for theft prevention purposes.

Total distance is commonly referred to as distance traveled by the bicycle from the beginning of travel after the display has been mounted on the bicycle (or master reset) until the present, and it may be computed by counting pulses from the rotation sensor since that time. Travel distance is commonly referred to as distance traveled by the bicycle from the point at which a device referred to as a trip meter is reset, and it may be computed by counting pulses from the rotation sensor since the trip meter was reset. The computed total distance and travel distance are stored in the memory and selectively displayed as desired by the rider.

With conventional bicycle computers, the microprocessor and memory may not operate normally if power is insufficient due to low battery charge. For example, if the rider performs a process to set or modify data stored in the memory, the data stored in the memory may be erased as a result of a malfunction of the memory or the microprocessor due to insufficient power. This makes it necessary to again modify or reset the data after replacing the battery, thus posing considerable inconvenience to the rider.

SUMMARY OF INVENTION

The present invention is directed to various features of a bicycle information processing apparatus. In one embodiment, a bicycle information processing apparatus comprises a memory for storing information related to the bicycle; an information processing unit that accesses the memory and processes information stored in the memory; and a power supply sensor that detects an ability of a power supply to supply power so that the memory may be accessed without damaging information stored therein. Additional inventive features will become apparent from the description below, and such features alone or in combination with the above features may form the basis of further inventions as recited in the claims and their equivalents.

DETAILED DESCRIPTION

Figure 1:
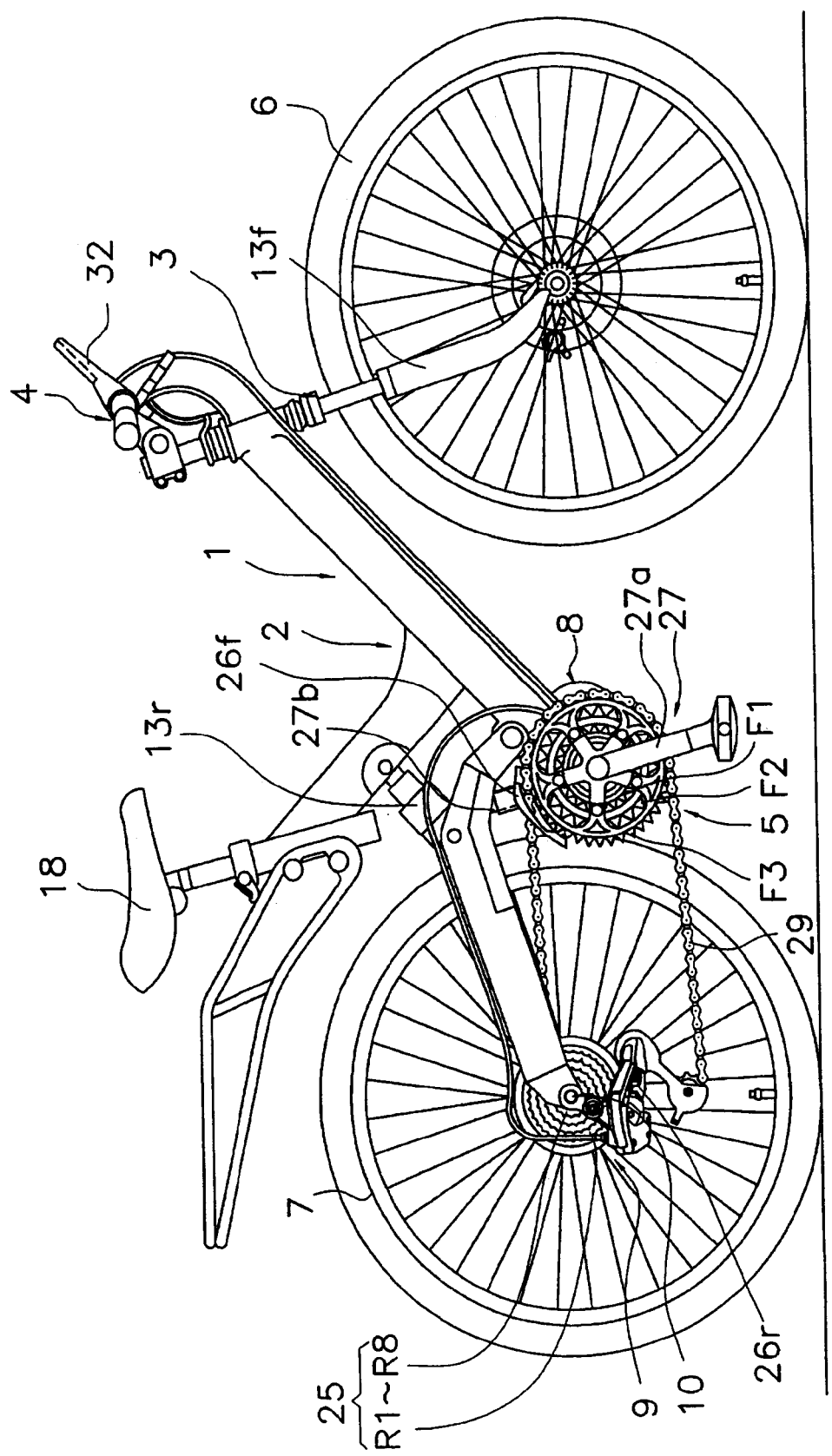
FIG. 1 is a side view of a particular embodiment of a bicycle.

FIG. 1 is a side view of a particular embodiment of a bicycle 1. Bicycle 1 is a mountain bicycle that comprises a frame body 2 constructed by welding together tubing having noncircular cross-sections. A front fork 3 is mounted to the front of frame body 2 for rotation around an inclined axis, and a handlebar assembly 4 is mounted to the top of front fork 3. A saddle 18 is mounted to the upper middle part of frame body 2, a drive mechanism 5 is mounted to the lower part of frame body 2, a front wheel 6 is rotatably mounted to the bottom of front fork 3, and a rear wheel 7 having a hub dynamo 10 is rotatably mounted to the rear of frame body 2. Hub dynamo 10 houses an alternating current generator 19 (FIG. 3) for generating electricity through rotation of rear wheel 7. A front transmission 8 including a front derailleur 26f is mounted to the lower middle part of frame body 2, and a rear transmission 9 including a rear derailleur 26r is mounted to the rear of frame body 2. A front suspension 13f is mounted to front fork 3, and a rear suspension 13r is mounted between stationary and articulated portions of frame body 2.

Figure 2:
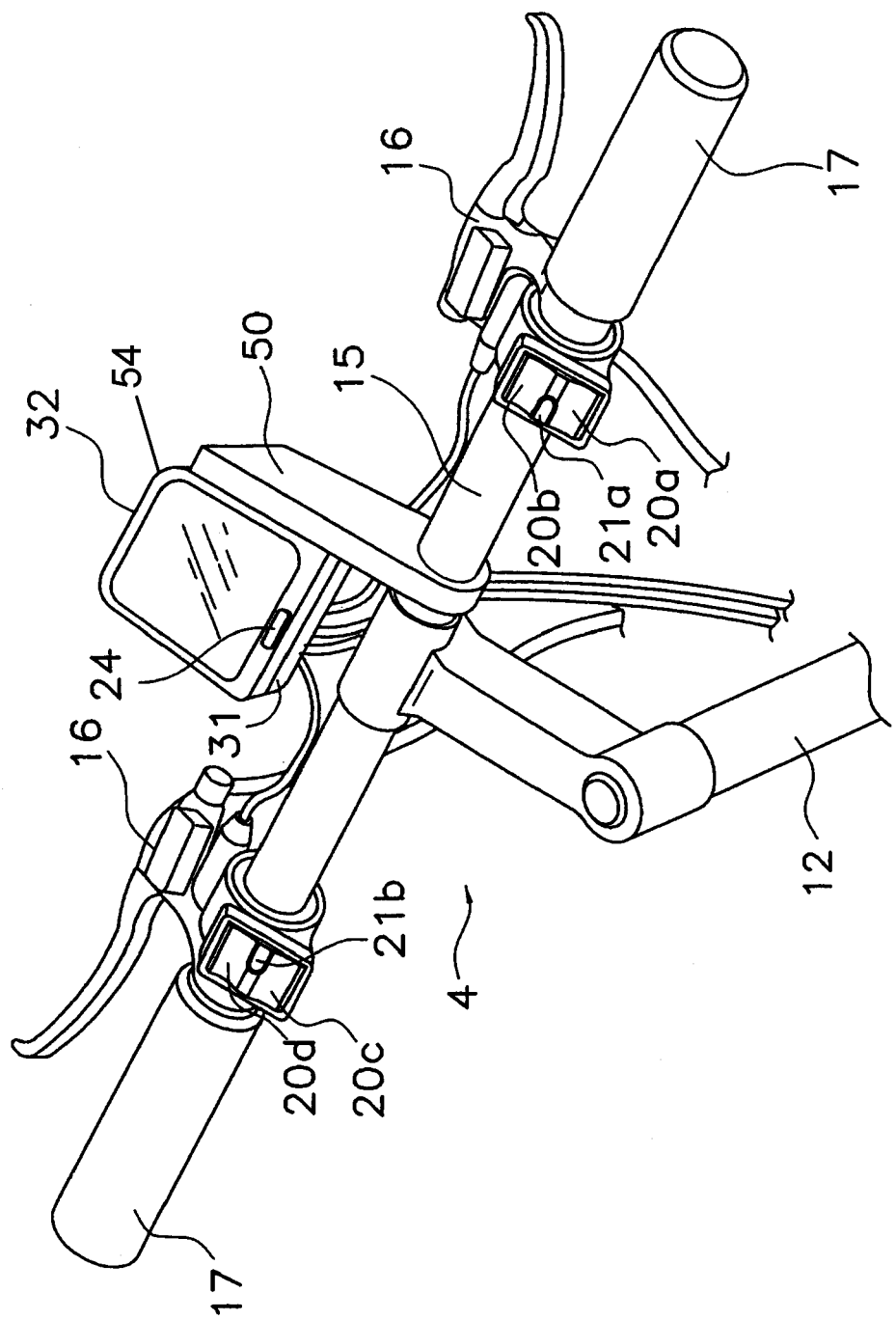
FIG. 2 is a more detailed view the handlebar assembly.

As shown in FIG. 2, handlebar assembly 4 comprises a handle stem 12 mounted to the top of front fork 3 and a handlebar 15 mounted to the top of handle stem 12. Brake lever assemblies 16 and grips 17 are mounted at the opposite ends of handlebar 15. The right side brake lever assembly 16 includes a rear downshift switch 20a for manually downshifting rear derailleur 26r in single increments, a rear upshift switch 20b for manually upshifting rear derailleur 26r in single increments, and a mode switch 21a for switching between automatic and manual shift modes. The left side brake lever assembly 16 includes a front downshift switch 20c for manually downshifting front derailleur 26f in single increments, a front upshift switch 20d for manually upshifting front derailleur 26f in single increments, and a suspension control switch 21b for adjusting the stiffness of front suspension 13f and rear suspension 13r.

As shown in FIG. 1, drive mechanism 5 comprises a crank 27 rotatably mounted at the bottom bracket of frame body 2, front and rear transmissions 8 and 9, and a chain 29. Front transmission 8 comprises, for example, three front sprockets F1–F3 and front derailleur 26f. Front sprockets F1–F3 are mounted to crank 27, and front derailleur 26f is mounted on frame body 2. Rear transmission 9 comprises, for example, a multiple sprocket assembly 25 having eight rear sprockets R1–R8 and rear derailleur 26r. Multiple sprocket assembly 25 is mounted to rear wheel 7 and rear derailleur 26r is mounted at the back of frame body 2. Crank 27 comprises a right crank arm 27a and a left crank arm 27b, wherein front sprockets F1–F3 are mounted to right crank arm 27a. Chain 29 engages one of the front sprockets F1–F3 and one of the rear sprockets R1–R8.

Front sprockets F1–F3 are arranged in the order of an increasing number of teeth, wherein front sprocket F1 is the laterally innermost front sprocket having the least number of teeth, and front sprocket F3 is the laterally outermost front sprocket having the most number of teeth. Rear sprockets R1–R8 are arranged in the order of a decreasing number of teeth, wherein rear sprocket R1 is the laterally innermost rear sprocket having the most number of teeth, and rear sprocket R8 is the laterally outermost rear sprocket having the least number of teeth.

A rotation sensor (not shown in FIG. 1) is provided for sensing the rotation of crank 27. The presence or absence of rotation of crank 27 ordinarily is used in part to control the operation of front and rear transmissions 8 and 9. For example, derailleurs cannot shift properly when crank 27 is stationary, so any requested operation of a derailleur may be delayed until crank 27 is rotating. A rotation sensor typically comprises a reed switch 23 (FIG. 3) mounted to frame body 2 and a magnet (not shown) mounted to one of the crank arms 27a and 27b so that reed switch 23 provides a pulse whenever the magnet passes by.

A controller 11 (FIGS. 3 and 4) is provided for controlling various components including the front and rear transmissions 8 and 9 and the front and rear suspensions 13f and 13r. More specifically, controller 11 controls front and rear transmissions 8 and 9 in response to the operation of shift switches 20a–20d and mode switch 21a, and it controls front and rear suspensions 13f and 13r in response to the operation of control switch 21b. Controller 11 also automatically controls the operation of front and rear transmissions 8 and 9 in response to bicycle velocity.

Figure 3:
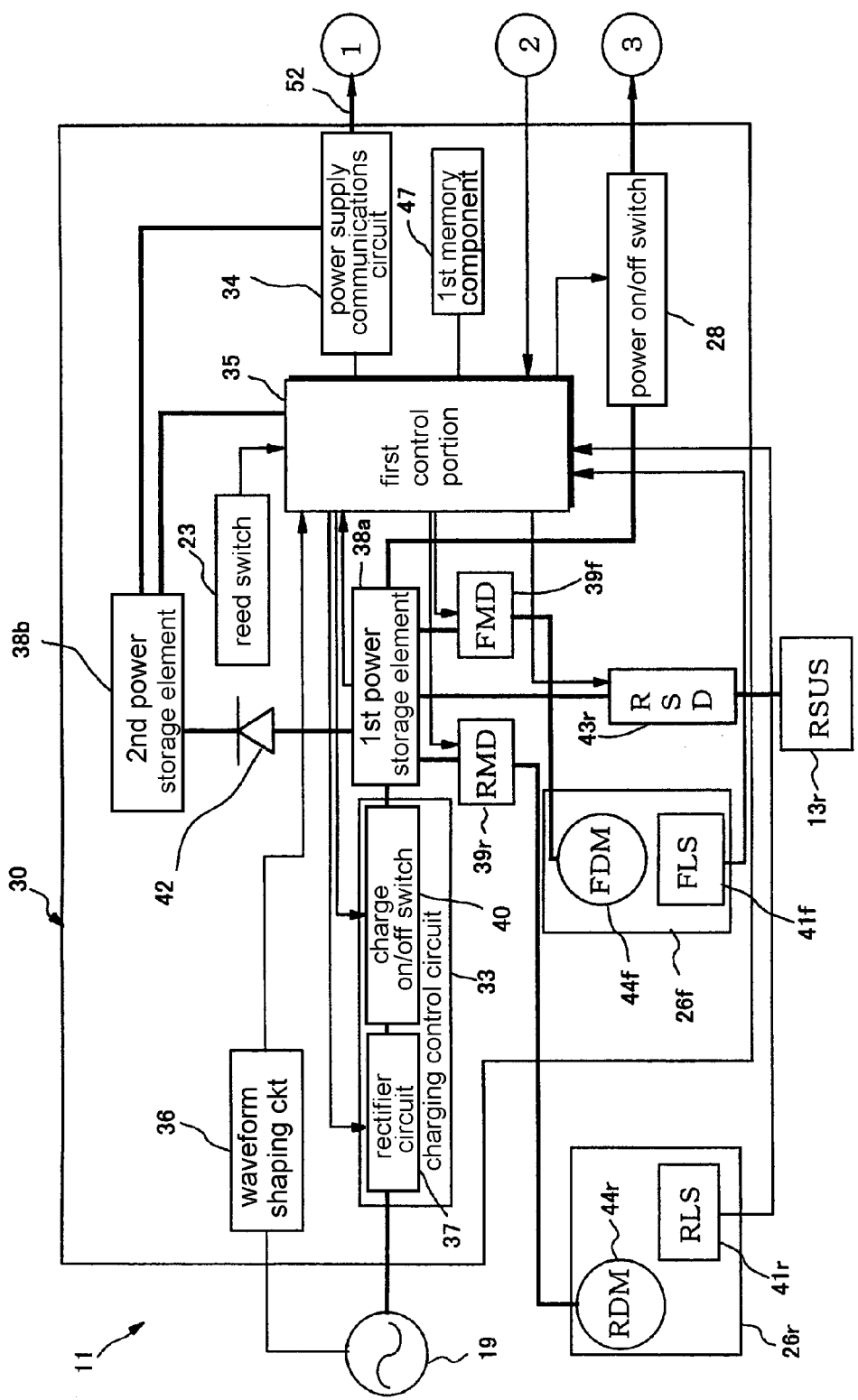
FIGS. 3 and 4 are schematic block diagrams of a computer control device for components of the bicycle.
Figure 4:
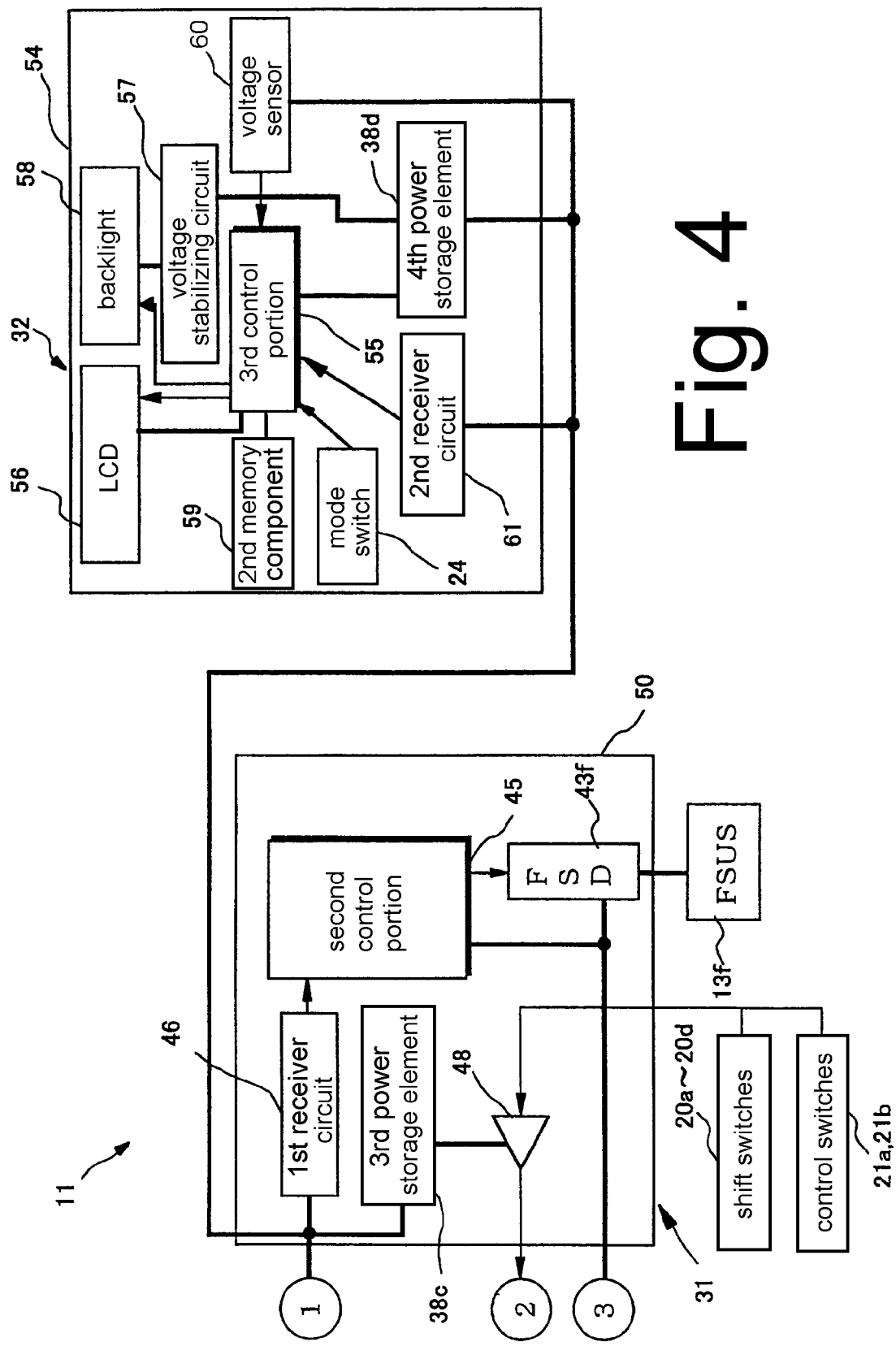

As shown in FIGS. 3 and 4, controller 11 comprises a first control unit 30, a second control unit 31, and a third control unit 32. First control unit 30 may be mounted, for example, on the bottom bracket of frame body 2 in proximity to the rotation sensor and front derailleur 26f, and it is connected to alternating current generator 19. The electrical current generated by alternating current generator 19 powers first control unit 30, and first control unit 30 uses the supplied electrical current to control the operation of front derailleur 26f, rear derailleur 26r and rear suspension 13r. First control unit 30 also supplies control signals (e.g., a velocity signal) superimposed on a relatively low current signal (e.g., pulse code modulated (PCM) signals) to second control unit 31 and third control unit 32. Since first control unit 30 is disposed on the bottom bracket of frame body 2, it is fairly close to alternating current generator 19. As a result, a short power cable may be used to connect first control unit 30 to alternating current generator 19, and the communication of power between the two may be carried out with high efficiency.

First control unit 30 controls front transmission 8, rear transmission 9 and rear suspension 13r in accordance with the operating mode set by mode switch 21a. In this embodiment, in automatic mode, front transmission 8 and rear transmission 9 are controlled according to bicycle velocity, and rear suspension 13r may be set in one of two levels (e.g., hard or soft) depending on bicycle velocity. In manual mode, rear transmission 9 is controlled by the operation of shift switches 20a and 20b, front transmission 8 is controlled by the operation of shift switches 20c and 20d, and rear suspension 13r is controlled by the operation of control switch 21b.

First control unit 30 has a first control portion 35 that comprises an information processing unit in the form of a microcomputer including a CPU, memory, I/O interface, and the like. A number of modules are connected to first control portion 35. Such modules include a waveform shaping circuit 36 for generating a velocity signal from pulses output from alternating current generator 19; a charging control circuit 33; a first power storage element 38a; a second power storage element 38b; the rotation sensor reed switch 23; a power supply and communications circuit 34 that switches on and off a relatively low current signal from second power storage element 38b to second control unit 31 and third control unit 32 and provides the composite power/control PCM signals mentioned above to second control unit 31 and third control unit 32; a power on/off switch 28 that switches on and off a relatively high current signal from first power storage element 38a to second control unit 31; a front motor driver (FMD) 39f for operating a front derailleur motor (FDM) 44f for front derailleur 26f; a rear motor driver (RMD) 39r for operating a rear derailleur motor (RDM) 44r for rear derailleur 26r; a front operating location sensor (FLS) 41f for front derailleur 26f; a rear operating location sensor (RLS) 41r for rear derailleur 26r; a rear suspension driver (RSD) 43r for operating rear suspension 13r; and a first memory component 47 for storing travel information such as total distance (in which case it functions as a cumulative information memory) and so on. First memory component 47 may comprise a nonvolatile memory such as an EEPROM, a flash memory, etc., for retaining the data stored therein even when the power source is interrupted.

Second control unit 31 controls front suspension 13f in response to control signals sent by first control unit 30. More specifically, in automatic mode the hardness of front suspension 13f is adjusted depending on bicycle velocity, whereas in manual mode the hardness of front suspension 13f is adjusted in response to the operation of control switch 21b. Second control unit 31 also provides control information from switches 20a–20d, 21a and 21b to first control unit 30. For these functions, second control unit 31 includes a third power storage element 38c, a front suspension driver (FSD) 43f for operating front suspension 13f, a second control portion 45 that comprises an information processing unit in the form of a microcomputer, a first receiver circuit 46 for receiving composite power/control signals from power supply and communications circuit 34 in first control unit 30, and a buffer 48. As shown in FIG. 2, second control unit 31 is attached to handlebar 15 of handlebar assembly 4 by means of a bracket 50, with the components of second control unit 31 housed within bracket 50.

Third control unit 32 is housed in a case member 54 detachably installed on second bracket 50, and it functions primarily as a display component. Third control unit 32 has an information display in the form of a liquid crystal display (LCD) 56 that displays travel information such as bicycle velocity, cadence, distance traveled, shift position, suspension status, and other information. Third control unit 32 controls LCD 56 in response to control signals output by first control unit 30. For that purpose, third control unit 32 also includes a fourth power storage element 38d, a third control portion 55 that comprises an information processing unit in the form of a microcomputer, a voltage stabilizing circuit 57, a backlight 58 for illuminating display 56, a second memory component 59, a voltage sensor 60, and a second receiver circuit 61 for receiving composite power/control signals from power supply and communications circuit 34 in first control unit 30. A mode switch 24 protrudes outward from case member 54 as shown in FIG. 2 and provides signals to third control portion 55 to select the types of information displayed on LCD 56. Mode switch 24 also may be used to reset travel distance (i.e., begin calculating travel distance anew) such as by depressing mode switch 24 for a selected time interval (e.g., 3 seconds or longer), and to perform other control functions.

Figure 9:
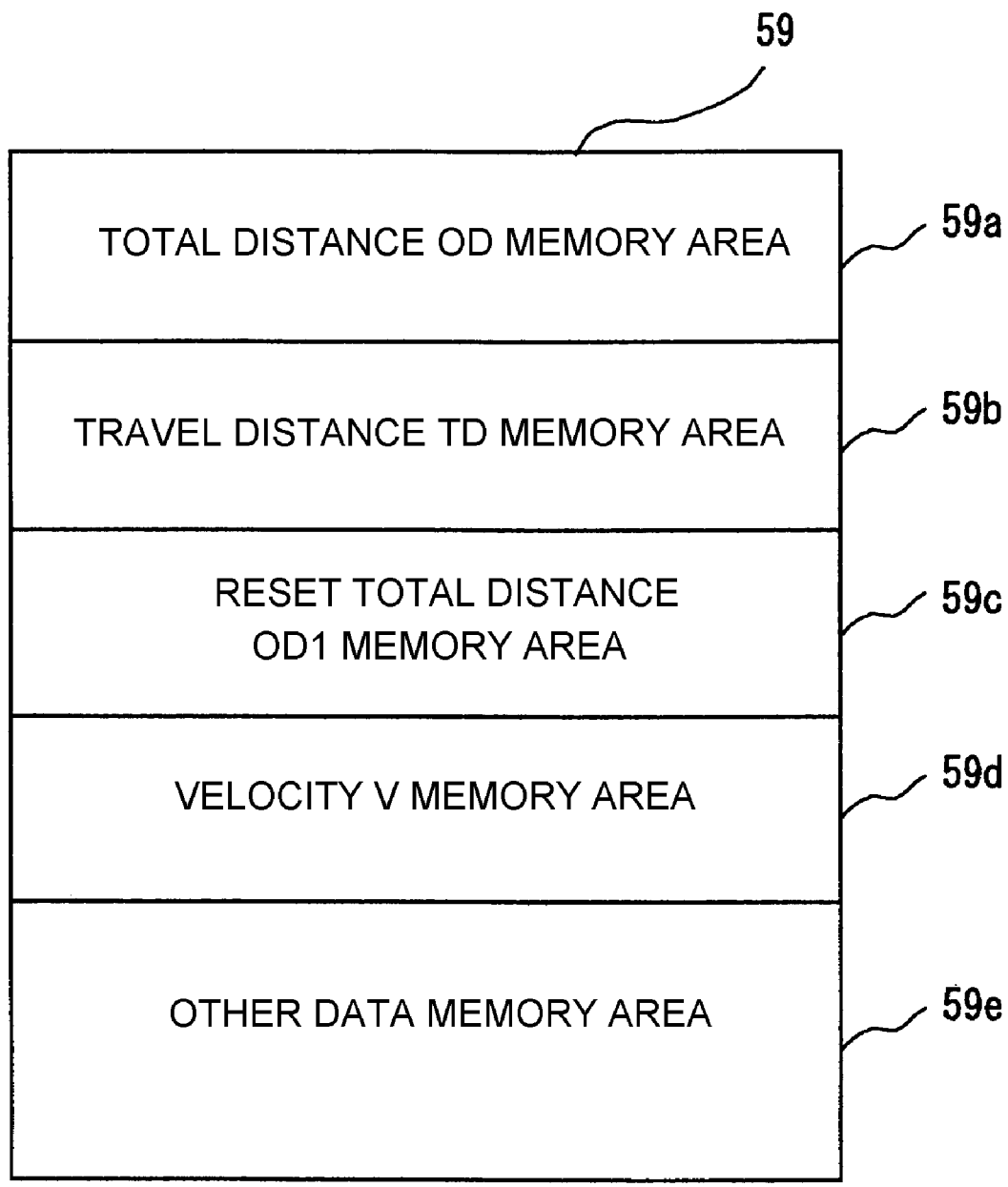
FIG. 9 is a block diagram of a particular embodiment of contents of a memory component.

Second memory component 59 may store travel information such as travel distance, total distance (in such cases it functions as a cumulative information memory), travel time, and so on. In this embodiment, second memory component 59 comprises a nonvolatile memory such as an EEPROM so that the various types of data may be retained even when the power source is interrupted as a result of third control unit 32 being detached from second control unit 31. However, in the case of an EEPROM, normal operation of the memory becomes difficult when the operating power falls below approximately 1.8V. As shown in FIG. 9, second memory component 59 may be divided into a total (overall) distance (OD) memory area 59$a$ for storing total distance OD output from first control portion 35, a travel distance (TD) memory area 59$b$ for storing travel distance TD since reset, a reset total distance (OD1) memory area 59$c$ for storing the total distance OD at reset, a velocity (V) memory area 59$d$ for storing changes of the velocity V to display average velocity, maximum velocity, or the like, and an other data memory area 59$e$ for storing other data.

Returning again to first control unit 30, second power storage element 38$b$ is connected to first power storage element 38$a$ through a diode 42. Diode 42 causes electrical current to flow in one direction only from first power storage element 38$a$ to second power storage element 38$b$. In other words, diode 42 prevents reverse current flow from second power storage element 38$b$ to first power storage element 38$a$. In this embodiment, first power storage element 38$a$ is employed mainly as a power supply for electrical components with high power consumption and high electrical capacity, such as drivers 39$f$, 39$r$, 43$f$ and 43$r$, whereas second power storage element 38$b$ is employed as a power supply for electrical components having low power consumption and low electrical capacity, such as first control portion 35, third control portion 55, and LCD 56. First and second power storage elements 38$a$ and 38$b$ may comprise high-capacity capacitors, such as electric double layer capacitors. These capacitors store direct current power output from alternating current generator 19 and rectified by charging control circuit 33. Of course, instead of capacitors, first and second power storage elements 38$a$ and 38$b$ could comprise secondary cells, such as nickel-cadmium, lithium ion, or nickel hydrogen cells.

Charging control circuit 33 comprises a rectifier circuit 37 and a charge on/off switch 40. Rectifier circuit 37 rectifies current output from alternating current generator 19 to produce DC current, and charge on/off switch 40 switches on and off the current output by the rectifier circuit 37 in response to control signals from first control portion 35. More specifically, first control portion 35 monitors the voltage of first power storage element 38$a$. Below a predetermined voltage (e.g., 5.5V), first control portion 35 outputs a control signal for switching on the charge on/off switch 40, thus allowing first power storage element 38$a$ to charge. On the other hand, if the voltage of first power storage element 38$a$ goes above a predetermined voltage (e.g., 7V), first control portion 35 outputs a control signal for switching off the charge on/off switch 40, thereby preventing excessive voltage from accumulating in first power storage element 38$a$.

Power on/off switch 28 is connected to first power storage element 38$a$ and to first control portion 35. Power is switched on to activate second control portion 45 and FSD 43$f$ when it is necessary to adjust front suspension 13$f$, but power is switched off otherwise. As a result, needless power consumption from first power storage element 38$a$ can be avoided.

Power supply and communications circuit 34 is connected to second storage element 38$b$ and to first control portion 35. As noted above, power supply and communications circuit 34 switches on and off a relatively low current signal from second power storage element 38$b$ to second control unit 31 and third control unit 32 and provides composite power/control signals to second control unit 31 and third control unit 32, thus functioning as an information output. It does this through a single communication line 52 to reduce components. Power supply and communications circuit 34 is controlled in response to information such as velocity, distance traveled, current transmission gear, automatic vs. manual modes, suspension hardness and the like.

As shown in FIG. 4, first receiver circuit 46 in second control unit 31 is connected to power supply and communication circuit 34 through communication line 52, thus functioning as an information input. First receiver circuit 46 extracts the control signals from the composite power/control signals from power supply and communication circuit 34 and communicates the control signals to second control portion 45. Third power storage element 38$c$ also is connected to power supply and communications circuit 34. Third power storage element 38$c$ may comprise, for example, a relatively high capacity capacitor such as an electrolytic capacitor, and it is provided to smooth the electrical current from the composite power/control signals received from power supply and communications circuit 34. Third power storage element 38$c$ provides operating power to buffer 48 that functions to stabilize the analog voltage signals from shift switches 20$a$–20$db$ and control switches 21$a$ and 22$b$.

Second receiver circuit 61 and fourth power storage element 38$d$ in third control unit 32 also are connected to power supply and communication circuit 34 (in parallel with first receiver circuit 46). Second receiver circuit 61 extracts the control signals from the composite power/control signals from power supply and communication circuit 34, thus functioning as an information input, and communicates the control signals to third control portion 55. Fourth power storage element 38$d$ may comprise an electrolytic capacitor that provides operating power directly to third control portion 55 and indirectly to backlight 58 through voltage stabilizing circuit 57. Voltage stabilizing circuit 57 stabilizes the voltage from fourth power storage element 38$d$ to avoid flickering of backlight 58 that otherwise may be caused by the pulsed control signals superimposed on the power signals from power supply and communications circuit 34.

A power supply sensor in the form of a charge status sensor such as a voltage sensor 60 also is connected to power supply and communication circuit 34 (in parallel with second receiver circuit 61 and fourth power storage element 38$d$) and to third control portion 55, and it senses the voltage of second charge storage element 38$b$. As a result, third control portion 55 can determine whether or not voltage supplied to the second memory component 59 (i.e., the voltage of the second charge storage element 38$b$) is sufficiently above the safe operating voltage of second memory component 59. Third control portion 55 then can access second memory component 59 only when it is safe to do so (e.g., when it can be assured that the information stored in second memory component 59 will not be erased or otherwise damaged). Assuming a minimum operating voltage of 1.8V with a margin of 1V, for example, third control portion 55 would access second memory component 59 only when the voltage of the second power storage element 38b exceeds 2.8V.

Figure 5:
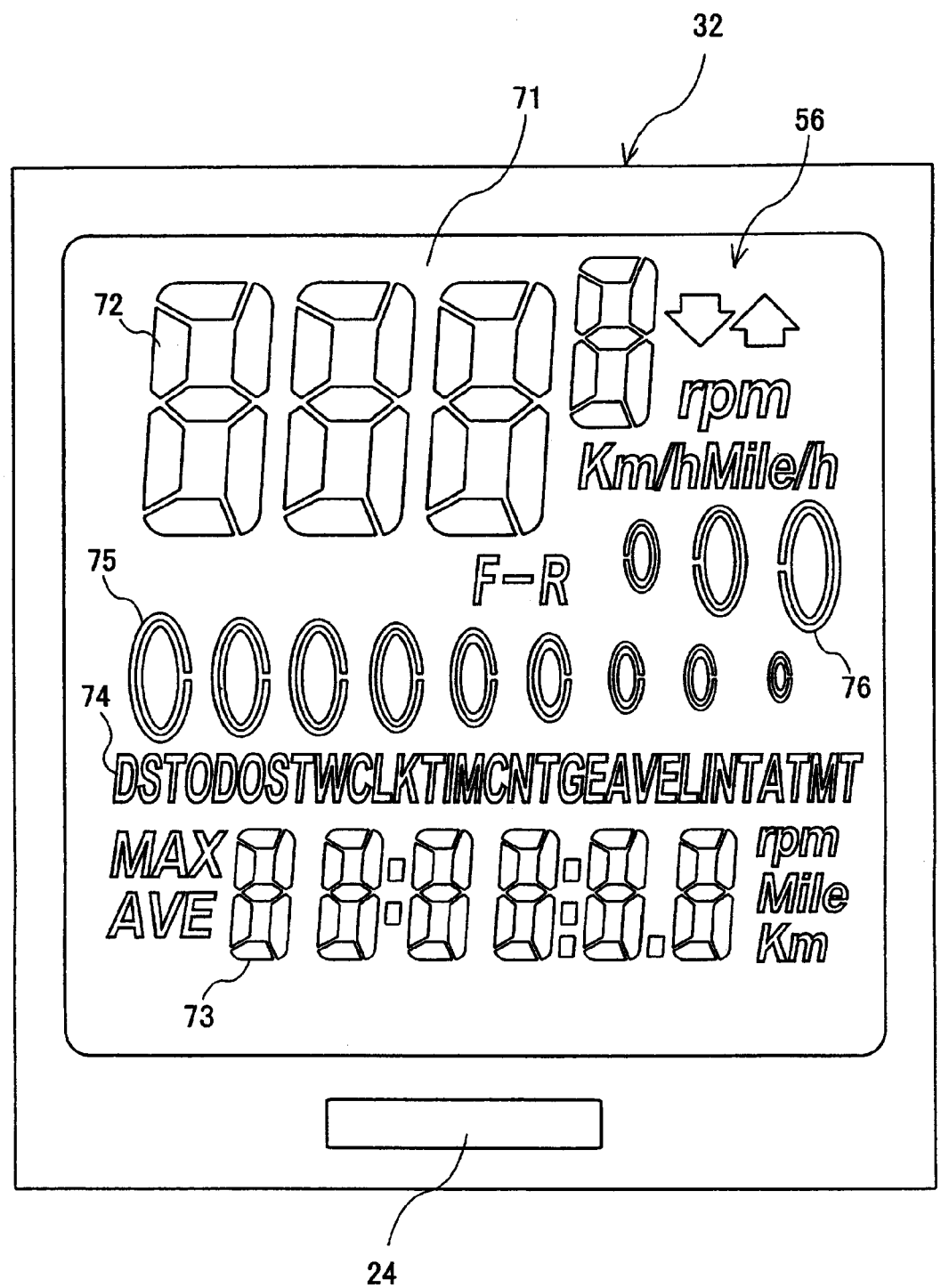
FIG. 5 is an illustration of items displayed on the computer display.

FIG. 5 illustrates an embodiment of information that may be shown on a display screen 71 of LCD 56. In this embodiment, display screen 71 comprises a main number display portion 72, an auxiliary number display portion 73, a description display portion 74, a rear gear position display portion 75, and a front gear position display portion 76. Information such as bicycle velocity, time, etc. is displayed in numerical format in main number display portion 72 and auxiliary number display portion 73. Description display portion 74 displays a description of the contents of main number display portion 72 and auxiliary number display portion 73, as well as showing the transmission operating mode. For example, "VEL" indicates travel velocity, "DST" indicates distance traveled, "CLK" indicates current time, "TIM" indicates travel time, and "GEA" indicates current shift position of the front and rear transmissions, "AT" indicates automatic shift mode, "MT" indicates manual shift mode, and so on. The unit of velocity can be switched between "Km/h" and "Mile/h", and the unit of distance can be switched between "Km" and "Mile."

The rear gear position display portion 75 shows the gear position of the rear transmission 9, and it comprises a plurality of (e.g., nine) elliptical display symbols gradually decreasing in diameter from left to right to correspond with the size of the actual rear sprockets R1–R8. When initializing LCD 56, the number of sprockets for rear transmission 9 can be set to match the actual number of sprockets installed on the bicycle. For example, when rear transmission 9 has eight sprockets, as in this embodiment, the number of rear sprockets is input to the cycle computer. Thereafter, eight elliptical display symbols are displayed from left to right in rear gear position display portion 75, with the one remaining symbol at the right end not displayed. Similarly, the front gear position display portion 76 shows the gear position of the front transmission 8, and it comprises a plurality of (e.g., three) elliptical display symbols gradually increasing in diameter from left to right to correspond with the size of the actual front sprockets F1–F3. When initializing LCD 56, the number of sprockets for front transmission 8 can be set to match the actual number of sprockets installed on the bicycle. For example, when front transmission 8 has two sprockets, the number of front sprockets is input to the cycle computer. Thereafter, two elliptical display symbols are displayed from right to left in front gear position display portion 76, with the one remaining symbol at the left end not displayed. As a result of this arrangement, the sprocket positions of front and rear transmissions 8 and 9 may be ascertained intuitively at a glance.

In operation, the alternating current generator 19 of hub dynamo 10 generates electricity as the bicycle is pedaled, and this electricity is supplied to first control unit 30, with power being stored by first and second power storage elements 38a and 38b. Since alternating current generator 19 is disposed on rear wheel 7, first and second power storage elements 38a and 38b can be charged simply by turning the pedals, with the bicycle remaining stationary, by lifting the rear wheel. Thus, it is a simple matter to at least partially charge first and second power storage elements 38a and 38b by turning the pedals to allow setting up of the electronically operated transmissions and the information displayed on LCD 56.

In automatic shift mode, derailleurs 26f and 26r and suspensions 13f and 13r are controlled according to a velocity signal generated by first control portion 35 from the shaped pulse output by waveform shaping circuit 36. More specifically, a shift operation is performed when the bicycle velocity is greater or less than predetermined values, wherein rear derailleur 26r is given preference in ordinary shift operations. Also, when velocity goes above a predetermined value, the hardness of the suspensions 13f and 13r is increased. Meanwhile, first control portion 35 calculates total distance OD from the shaped pulse output by waveform shaping circuit 36 and stores the result in first memory component 47. Total distance OD may be calculated by counting the shaped pulses, dividing the sum by the number of pulses per wheel rotation, and multiplying the quotient by the wheel circumference. Other cumulative information may be calculated as appropriate.

Control signals based on information such as velocity, total distance, transmission gear, automatic vs. manual modes, suspension hardness, and the like, are generated by first control portion 35 and output to power supply communications circuit 34. Power supply and communications circuit 34 superimposes the control signals on a power signal derived from second power storage element 38b to produce the appropriate PCM signals. The composite power/control signals are then communicated to second control portion 45 and third control portion 55, whereupon the composite power/control signals are decoded.

Second control portion 45 is powered by power signals received from power on/off switch 28 and outputs to RSD 43f signals for controlling front suspension 13f in response to the control signal portion of the composite power/control signals received from power supply and communications circuit 34. The power signal portion of the composite power/control signals received from power supply and communications circuit 34 powers buffer amp 48. When a control switch 21a or 21b or a shift switch 20a–20d is operated, a signal of different analog voltage is output to first control portion 35 via buffer amp 48, and first control portion 35 generates the appropriate control signals for controlling one or more of derailleurs 26f and 26r or suspensions 13f and 13r, or for changing the transmission operating mode.

Third control portion 55 is powered by the power signal portion of the composite power/control signals received from power supply and communications circuit 34. Third control portion 55 performs distance calculations and the like based on the control signal portion of the composite power/control signals received from power supply and communications circuit 34 and thereafter outputs to LCD 56 velocity and other kinds of information.

When driving a motor-driven electrical component having large electrical capacity, such as derailleurs 26f and 26r or suspensions 13f and 13r, there is a voltage drop in first power storage element 38a. If first control portion 35, third control portion 55 and LCD 56 were powered by first power storage element 38a, the voltage drop could cause the microprocessors and other electronics to reset or cause some other problem. Since the power for these components in this embodiment is provided from second power storage element 38b connected to first power storage element 38a through diode 42, the components are unaffected by voltage drops in first power storage element 38a. While second control portion 45 is powered by first power storage element 38a, it is normally off except when needed to control front suspension 13f. Consequently, second control portion 45 is unaffected by voltage drops in first power storage element 38a.

Figure 6:
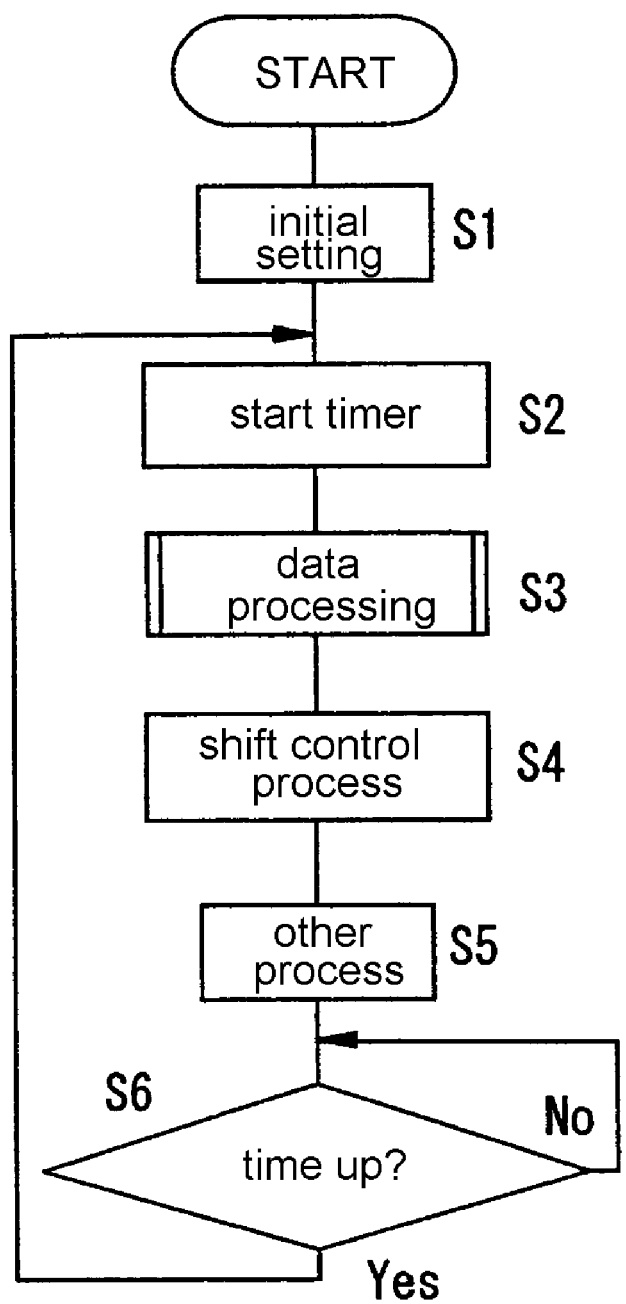
FIG. 6 is a flow chart of a particular embodiment of a main processing routine in a first control unit.

More specific operations of first control unit 30 and third control unit 32 now will be described with reference to FIGS. 6–8. FIG. 6 is a flow chart of a particular embodiment of a main processing routine in first control unit 30. When rear wheel 7 turns, alternating current generator 19 supplies electrical power to first control unit 30, and this power is stored in first power storage element 38a and second power storage element 38b. The power stored in second power storage element 38b is supplied to first control portion 35, and initialization of first control portion 35 is carried out in Step S1 of FIG. 6. In this initialization process, the transmission operating mode may be set to automatic shift mode, for example.

In Step S2, a timer that measures the processing time per microcomputer processing cycle is started. In Step S3, a data processing routine shown in FIG. 7 is performed for computing total distance and the like. In Step S4, a shift control process (automatic or manual) is executed in a manner described above. In Step S5, another process such as the establishment of the operating mode is executed. In Step S6, the process waits for the started timer to stop. When that occurs, the routine returns to Step S2.

Figure 7:
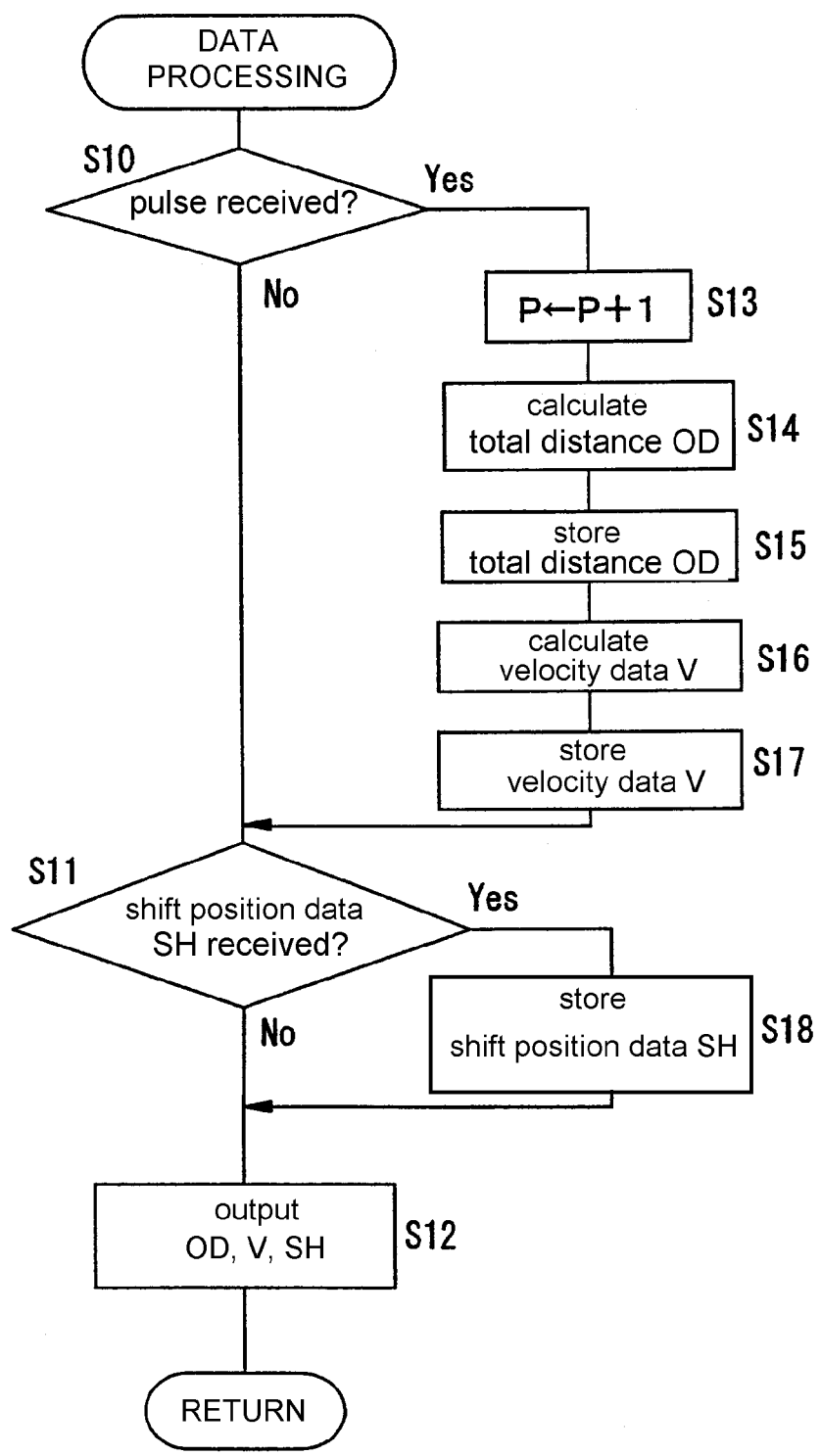
FIG. 7 is a flow chart of a particular embodiment of a data processing routine.

FIG. 7 is a flow chart of a particular embodiment of the data processing routine. It is first determined in Step S10 whether or not a pulse from the waveform shaping circuit 36 has been received. If so, a pulse count is incremented in Step S13, total distance OD is computed from the pulse count as described above in Step S14, the computed total distance OD is stored as the most recent total distance in first memory component 47 in Step S15, velocity data V is computed from the pulses output by waveform shaping circuit 36 in Step S16, and the computed velocity data V is stored in first memory component 47 in Step S17. Storing these values allows the most recent data to be output despite differences between computation timing and output timing.

In any event, it is then determined in Step S11 whether or not shift position data SH from the operating position sensors 41r and/or 41f has been received. If so, the data is converted to shift position data SH for display and is stored in first memory component 47 in Step S18. Thereafter, the total distance OD, velocity data V, shift position data SH and the like are output through communication line 52 to third control unit 32 in Step S12 for display.

Figure 8:
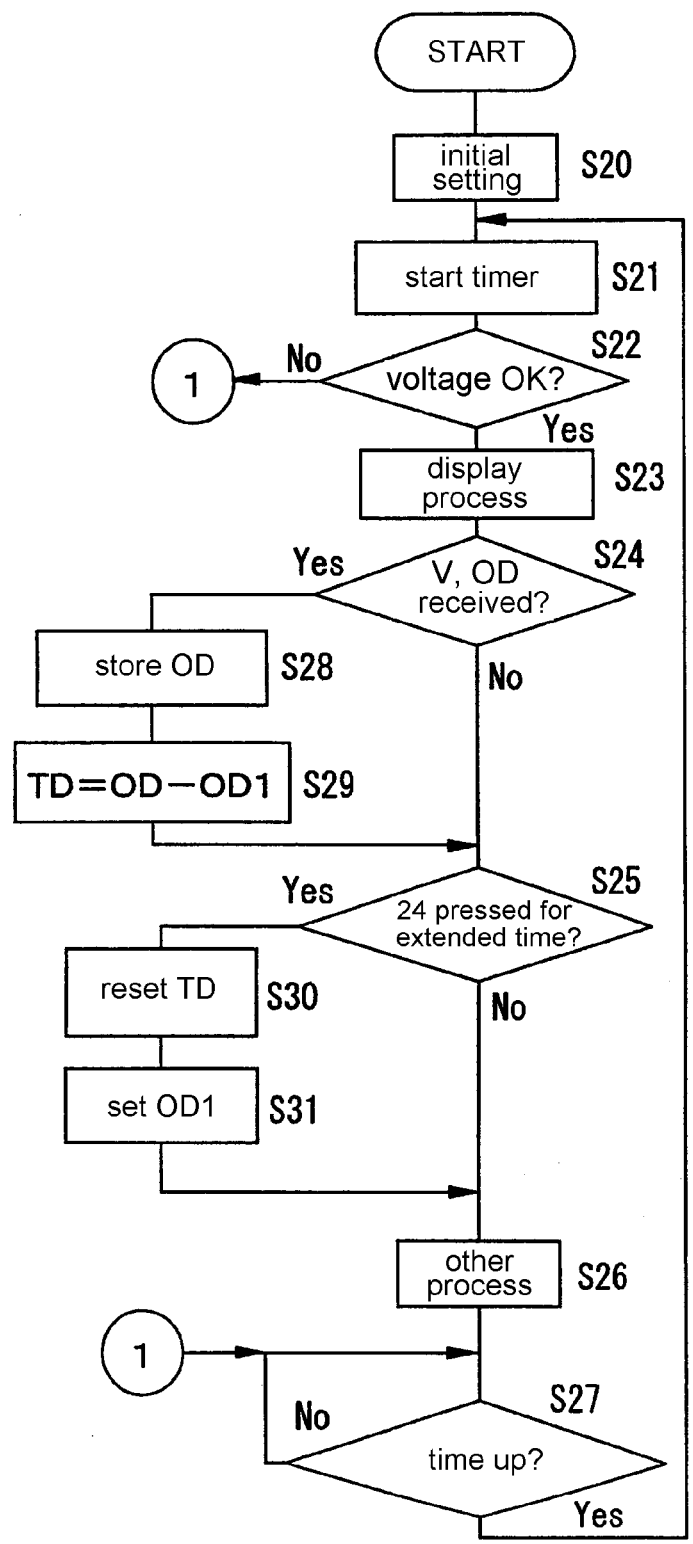
FIG. 8 is a flow chart of a particular embodiment of a main processing routine in a third control unit.

FIG. 8 is a flow chart of a particular embodiment of a main processing routine in third control unit 32. When power is supplied from second storage element 38b through communication line 52, third control portion 55 in third control unit 32 performs initialization in Step S20. In this initialization process, the units for distance or velocity may be set, for example. In Step S21, a timer that measures the processing time per microcomputer processing cycle of the third control portion 55 is started. It is then determined in Step S22 whether or not the power supplied by second power storage element 38b is sufficient to reliably operate third control portion 55 and second memory component 59. More specifically, it is determined in Step S22 whether or not the voltage of second power storage element 38b, as determined by voltage sensor 60, is above a predetermined value (e.g., 2.8V). If so, then a display process is performed in Step S23 to display on LCD 56 velocity, distance, front and rear shift positions, and other data as appropriate. In this embodiment, either travel distance TD or total distance OD is selected for display on the auxiliary number display portion 73 in response to the operation of mode switch 24, thus allowing the display area to be more compact.

It is then determined in Step S24 whether or not velocity V or total distance OD data has been received from first control portion 35 through communication line 52. If so, the received total distance OD is stored in the total distance OD memory area 59a of second memory component 59 in Step S28. Then, in Step S29, the reset total distance OD1 stored in the reset total distance OD1 memory area 59c is subtracted from the stored total distance OD to compute the travel distance TD, and the travel distance is then stored in the travel distance TD memory area 59b of second memory component 59. The total distance OD or travel distance TD is displayed at the next occurrence of the display process in Step S23.

In any event, it is determined in Step S25 whether or not mode switch 24 has been pressed for a long time (thereby functioning as a start input component). If so, the travel distance TD stored in the travel distance TD memory area 59b is reset to 0 in Step S30, and the current total distance OD is stored as the reset total distance OD1 in the reset total distance OD1 memory area 59c in Step S31. Storing the reset total distance OD1 allows the travel distance TD to be accurately calculated from a subsequently received total distance OD even when the power source is interrupted, such as when third control unit 32 is detached from second control unit 31.

In any event, another process such as one triggered by a normal operation of mode switch 24 is executed in Step S26. Then, the process waits in Step S27 for the timer started in Step S21 to stop. When that occurs, the routine returns to Step S21.

If it is determined in Step S22 that the power supplied by second power storage element 38b is not sufficient to reliably operate third control portion 55 and second memory component 59 (e.g., the voltage sensed by voltage sensor is below 2.8V), then processing immediately moves to Step S27, thus bypassing the display process of Step S23, the setting and memory accesses in Steps S24–S31, and the other processes of Step S26. This prevents malfunctions caused by insufficient operating power from second power storage element 38b and reduces the burden on the rider.

Figure 10:
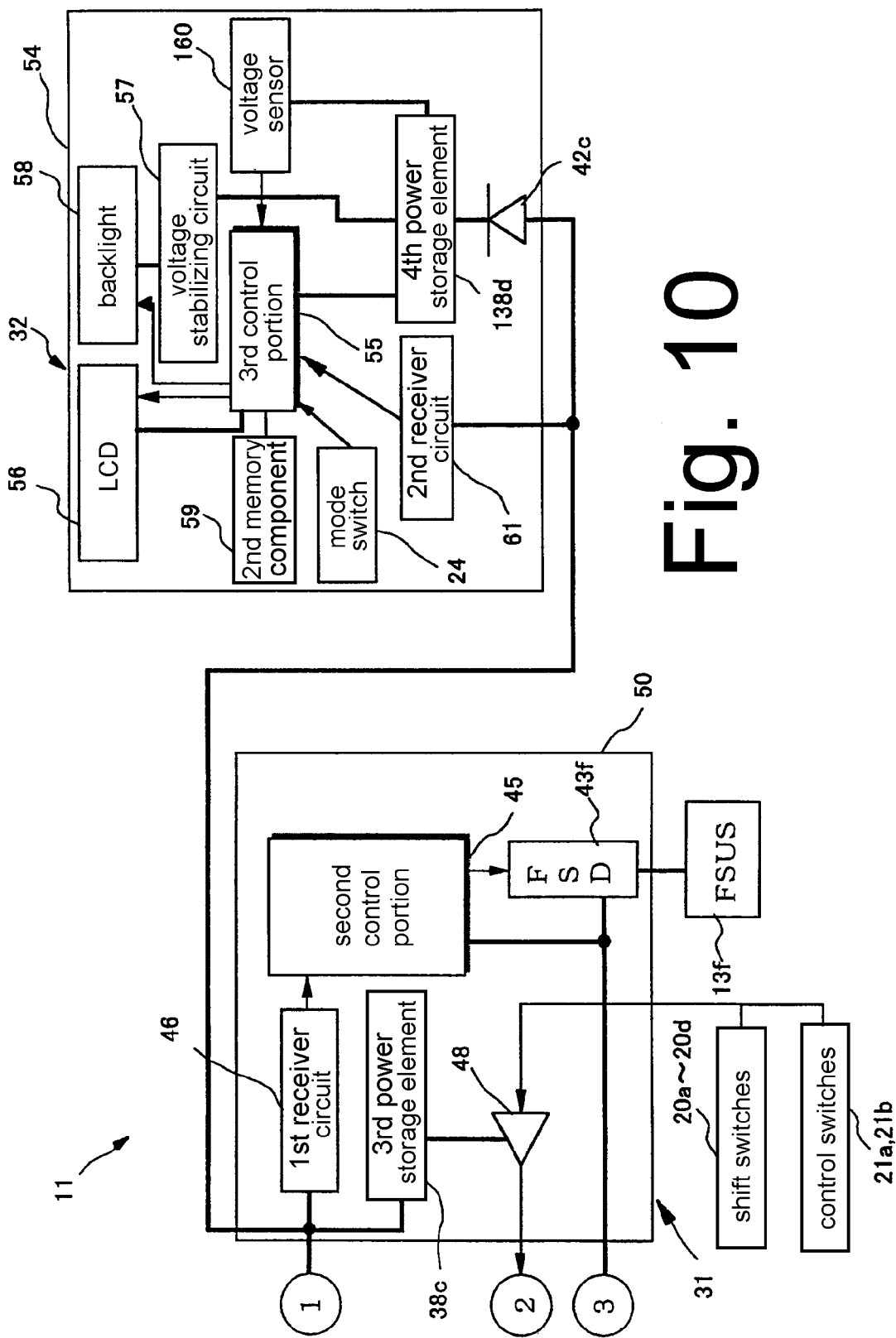
FIG. 10 is a schematic block diagram of an alternative embodiment of second and third control units.

While the above is a description of various embodiments of inventive features, further modifications may be employed without departing from the spirit and scope of the present invention. For example, in the embodiment described above, the second power storage element 38b served as the main power supply for all three control units 30–32. However, as shown in FIG. 10, the fourth power storage element 38d in third control unit 32 shown in FIG. 4 could be replaced by a fourth power storage element 138d that serves as the power supply for the components in third control unit 32. In that case, fourth power storage element 138d would comprise an electric double layer capacitor similar to the first and second power storage elements 38a and 38b. Furthermore, it is helpful to provide a diode 42c at the input to fourth power storage element 138d in order to prevent reverse current flow from fourth power storage element 138d to second power storage element 38b. A voltage sensor 160 then may be provided to sense the voltage of fourth power storage element 138d, and the system may operate according to the algorithm shown in FIG. 8. As a result of this modification, when the voltage of fourth power storage element 138d is above a predetermined value, the second memory component 59 can be accessed and various operations performed, even when third control unit 32 is detached from second control unit 31.

In the above embodiment, access to second memory component 59 was limited by sensed voltage. However, when the power supply comprises a charge storage element, access to second memory component 59 may be limited depending on some charge status other than voltage, such as electrical capacity stored in a charge storage element, or the like.

Figure 11:
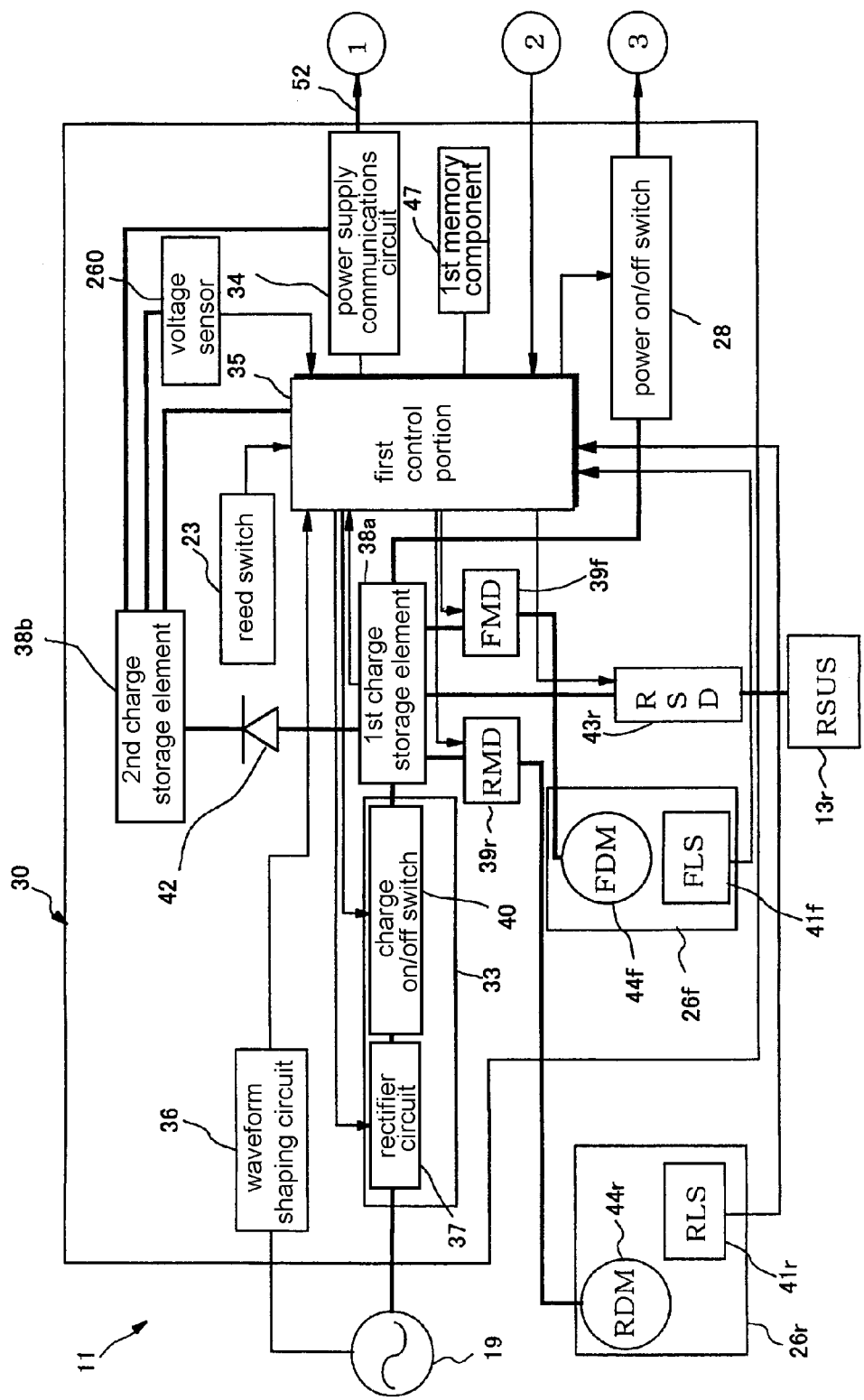
FIG. 11 is a schematic block diagram of an alternative embodiment of a first control unit.

In the above embodiment, the third control portion 55, second memory component 59 and voltage sensor 60 are housed within the case member 54. However, it is possible to house only LCD 56 in the case member 54. In that case, a memory, voltage sensor, and information processing portion may be integrally provided with first control unit 30 or second control unit 31. For example, the first memory component 47 in first control unit 30 could be employed as a combined information storage element for first control unit 30, and first control portion 35 could be employed as a combined information processing unit. In this case, as shown in FIG. 11, a voltage sensor 260 could be disposed inside first control unit 30, and the voltage of second power storage element 38*b* could be sensed to determine whether or not it is safe to access first memory component 47. First control portion 35 then would operate in a manner similar to that illustrated in FIGS. 7 and 8.

While three control units were provided for performing shift and suspension control in the above embodiments, the teachings herein could be applied to an integrated cycle computer that displays travel information such as velocity and distance. In this case, the unitary cycle computer could be powered by a charge storage element or battery housed within the cycle computer or by some external power supply.

In the above embodiment, first control unit 30, second control unit 31 and third control unit 32 were operatively coupled by wiring them together, but any of them may be operatively coupled by a wireless communication arrangement.

In the embodiments described above, only a single total distance OD is stored in the reset total distance OD1 memory area 59*c* of second memory component 59. However, total distances OD for several bicycles could be stored in the reset total distance OD1 memory area 59*c* as well. In this case, it is possible to accurately display travel distance for each individual bicycle, even when third control unit 32 is swapped among several bicycles.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle information processing apparatus operated by power from a power supply that is attachable to a bicycle and normally charges and discharges during operation of the bicycle, wherein the apparatus comprises:

a memory for storing information related to the bicycle;

an information processing unit that accesses the memory and processes information stored in the memory; and a power supply sensor that detects an ability of the power supply to supply power as the power supply charges and discharges during normal operation of the bicycle so that the memory may be accessed without damaging information stored therein.

2. The apparatus according to claim 1 wherein the information processing unit accesses the memory only when the power supply sensor detects that the power supply is capable of supplying power so that the memory may be accessed without damaging information stored therein.

3. The apparatus according to claim 1 further comprising an information display for displaying information processed by the information processing unit.

4. The apparatus according to claim 1 wherein the power supply sensor comprises a voltage sensor.

5. The apparatus according to claim 4 further comprising a power storage element that stores power from the power supply, wherein the voltage sensor senses a voltage of the power storage element.

6. The apparatus according to claim 5 wherein the information processing unit accesses the memory only when the voltage sensor detects that the power storage element is capable of supplying power so that the memory may be accessed without damaging information stored therein.

7. The apparatus according to claim 1 further comprising a first housing that houses the memory, the information processing unit and the power supply sensor.

8. The apparatus according to claim 7 further comprising an information display for displaying information processed by the information processing unit.

9. The apparatus according to claim 8 wherein the information display is housed within the first housing.

10. The apparatus according to claim 8 further comprising a second housing, wherein the information display is housed within the second housing separately from the memory, the information processing unit and the power supply sensor.

11. The apparatus according to claim 7 further comprising a receiver operatively coupled to the information processing unit and structured to receive information from an information processing unit.

12. The apparatus according to claim 11 wherein the receiver receives first cumulative information calculated by the information processing unit.

13. The apparatus according to claim 12 wherein the first cumulative information comprises a total distance traveled by the bicycle.

14. The apparatus according to claim 12 further comprising a start input component for initiating computation of second cumulative information.

15. The apparatus according to claim 14 wherein the information processing unit stores the first cumulative information in the memory in response to operation of the start input component.

16. The apparatus according to claim 15 wherein the first cumulative information comprises a total distance traveled by the bicycle, and wherein the second cumulative information comprises travel distance of the bicycle.

* * * * *